US008533798B2

(12) United States Patent
Schenk

(10) Patent No.: US 8,533,798 B2
(45) Date of Patent: Sep. 10, 2013

(54) METHOD AND SYSTEM FOR CONTROLLING ACCESS TO NETWORKS

(75) Inventor: Michael Robert Schenk, The Hague (NL)

(73) Assignee: Nederlandse Organisatie voor toegepast-natuurwetenschappelijk Onderzoek TNO, Delft (NL)

( * ) Notice: Subject to any disclaimer, the term of this patent is extended or adjusted under 35 U.S.C. 154(b) by 756 days.

(21) Appl. No.: 12/305,568

(22) PCT Filed: Jun. 19, 2007

(86) PCT No.: PCT/NL2007/050296
§ 371 (c)(1),
(2), (4) Date: Apr. 3, 2009

(87) PCT Pub. No.: WO2007/148969
PCT Pub. Date: Dec. 27, 2007

(65) Prior Publication Data
US 2009/0282467 A1    Nov. 12, 2009

(30) Foreign Application Priority Data
Jun. 19, 2006    (EP) .................................... 06076259

(51) Int. Cl.
*G06F 15/16*       (2006.01)
*H04K 1/00*       (2006.01)
*G06F 7/04*        (2006.01)
*H04M 1/66*       (2006.01)

(52) U.S. Cl.
USPC ........................ 726/7; 726/2; 726/3; 455/411

(58) Field of Classification Search
None
See application file for complete search history.

(56) References Cited

U.S. PATENT DOCUMENTS

| 7,430,614 B2 * | 9/2008 | Shen et al. .................... 709/245 |
| 2004/0233893 A1 | 11/2004 | Zhou et al. |

(Continued)

FOREIGN PATENT DOCUMENTS

| JP | 2004-70814 A | 3/2004 |
| JP | 2004-153300 A | 5/2004 |

(Continued)

OTHER PUBLICATIONS

International Search Report for PCT/NL2007/050296 dated Oct. 26, 2007.

*Primary Examiner* — Nathan Flynn
*Assistant Examiner* — Trang Doan
(74) *Attorney, Agent, or Firm* — Leydig, Voit & Mayer, Ltd.

(57) ABSTRACT

A method of providing access to both a first and a second network (1, 2) comprises the steps of: a terminal (4) requesting (RQ1), via the first network (1), access to the first network while providing a first identification (ID1), the first network verifying the first identification and, if the verification is successful, issuing a second identification (ID2), the terminal (4) requesting (RQ2), via the first network (1), access to the second network (2) while providing the second identification (ID2), an authentication server (112) verifying the second identification and, if the verification is successful, issuing a third identification (ID3), the first network (1) transmitting the third identification (ID 3) to the terminal (4), and the terminal (4) using the third identification (ID3) to obtain access to the second network (2). The first identification (ID1) may be a SIM card identification, the second identification (ID2) may be a network address, while the third identification (ID3) may be constituted by a one-time password.

17 Claims, 2 Drawing Sheets

(56) References Cited

U.S. PATENT DOCUMENTS

| | | | | |
|---|---|---|---|---|
| 2005/0086535 | A1* | 4/2005 | Ernst et al. | 713/201 |
| 2005/0102529 | A1* | 5/2005 | Buddhikot et al. | 713/200 |
| 2005/0114680 | A1* | 5/2005 | Chinnaswamy et al. | 713/185 |
| 2005/0176407 | A1* | 8/2005 | Tuomi et al. | 455/411 |
| 2005/0177733 | A1* | 8/2005 | Stadelmann et al. | 713/185 |
| 2005/0208926 | A1* | 9/2005 | Hamada | 455/410 |
| 2006/0094403 | A1* | 5/2006 | Norefors et al. | 455/411 |
| 2006/0235796 | A1* | 10/2006 | Johnson et al. | 705/44 |
| 2007/0149170 | A1* | 6/2007 | Bloebaum et al. | 455/411 |

FOREIGN PATENT DOCUMENTS

| | | |
|---|---|---|
| JP | 2006-86772 A | 3/2006 |
| JP | 2006-176093 A | 7/2006 |
| WO | WO 01/17310 A1 | 3/2001 |
| WO | WO 03/088577 A1 | 10/2003 |
| WO | WO 2006/101183 A1 | 9/2006 |

* cited by examiner

METHOD AND SYSTEM FOR CONTROLLING ACCESS TO NETWORKS

FIELD OF THE INVENTION

The invention relates to a method and system for providing access to a first and a second network.

BACKGROUND OF THE INVENTION

Methods and systems for allowing access to a communications network are generally known. For example most computer networks require a user to provide at a terminal a user name and a password before access is provided to the computer network. In the computer network, an access control is present, often provided as a suitable computer program executed by a network server, which compares the user name and password with suitable authentication criteria and allows access from the terminal in case the provided user name and password meet the authentication criteria.

However, the user has to be informed which user name and password to use. For common wired computer networks, the user is typically informed in writing or orally which user name and password are assigned. This is less convenient in case the assigned password changes frequently, since this requires a lot of paper mail to be sent. Furthermore, it takes a relatively long time for the user name and password to be received by the user.

In the art, a system for controlling access to a wireless local area network (WLAN) is known, which is offered for sale under the name "Orbyte Authentication Manager" by the company ServiceFactory A.B. based in Stockholm, Sweden. This system includes an authentication server which can be accessed by a terminal to obtain a one-time password (OTP). The terminal can access the authentication server via a WLAN gateway node, over the Internet. In this respect, a WLAN gateway node is popularly known as 'hotspot gateway' or simply 'hotspot'. Via the WLAN gateway node, the authentication server can obtain data from a Subscriber Identification Module (SIM) card to verify whether or not the user of the terminal is subscribed to WLAN services. In case the user is subscribed, the authentication server generates an OTP and transmits the assigned OTP to the terminal over the Internet via the WLAN gateway node, and hence over the WLAN. Thereafter, the terminal provides the OTP to a RADIUS server in order to obtain access to the WLAN. The RADIUS server compares the provided OTN with the assigned OTP to decide whether or not access is granted.

However, a disadvantage of the 'Orbyte Authentication Manager' is that the WLAN is used to obtain the OTP, before the terminal is actually granted access to the WLAN. Hence, the WLAN gateway, and other parts of the WLAN, are vulnerable to unauthorized access. Furthermore, to prevent unauthorized access, extensive security measures are required. This is particularly cumbersome in case the WLAN is operated by another entity than the entity which operates the network for which the SIM card is valid. Furthermore, the authentication server is accessible via the Internet which makes the authentication server susceptible to unauthorized access and therefore requires extensive security measures as well.

United States Patent Application US 2004/0233893 (Transat Technologies) discloses a system and method for transferring wireless network access passwords. In the system disclosed in said patent application, an access node for transferring and/or assigning network passwords includes a first interface for sending and receiving communications of a first type to and from a first node operating in a WLAN. The access node also includes a second interface for sending and receiving communications of a second type to and from a second node in a mobile network, such as a GSM/GPRS network. The access node can receive via the mobile network a short message service (SMS) message from a mobile device carrying the MSISDN of the mobile and can send an SMS message to the mobile device carrying an assigned OTP (one time password) for the WLAN access. The assigned OTP can than be inputted to the WLAN in order to obtain access to the WLAN.

However, a disadvantage of the system known from this prior art document is that extensive modifications have to be made to the authentication server in order to enable the authentication server to generate and receive SMS messages. Furthermore, either modifications are required for the wireless client and the mobile to obtain the access automatically, for example to generate and transmit a short message incorporating the MSISDN of the mobile and to be able to extract the OTP from a received SMS, or the user has to input the provided OTP manually in the WLAN.

In this respect, it should be noted that SMS does not use the actual, circuit switched, GSM network, but SMS messages are transmitted via the signalling channel of the GSM network, i.e. the channel via which supervisory and control signals are transmitted from and to the mobile device. Hence, extensive modifications are required, not only to enable transmission of SMS messages, but also to process messages from the signalling channel in another manner than controlling the connection or outputting them visually at a display of a mobile telephone.

International Patent Application WO 03/088577 (Nokia) discloses a method for authenticating the user of a terminal in a wireless local area network (WLAN). In this known method, the user terminal first makes contact with the service access point (or "hotspot") of the WLAN and only then it is checked with the user's mobile communications system whether the user has access rights. In other words, the messages exchanged between the user terminal and its home mobile communications system travel through the visited system. This requires the user terminal to already have some (limited) access before (full) access is granted. Accordingly, suitable arrangements must have been made to allow a visiting user terminal limiting access to the service point.

International Patent Application WO 01/17310 (Ericsson) discloses an authentication method in which GSM security principles are used to authenticate users who are requesting access to packet data networks. The method is initiated by a user trying to gain access to an access network. An authentication entity connected to this access network then sends an authorisation request to an authentication server. An authentication token sent to the user via the access network is sent back to the authentication server via a mobile network. Accordingly, the access network is involved in the authorisation procedure before actual (full) access is granted. This known access network therefore has to be able to distinguish between limited and full access rights.

International Patent Application WO 2006/101183 (Matsushita), published on 28 Sep. 2006, describes a system for automatic security authentication in a wireless network. A terminal has two communications units: a first unit for communicating with the access point and a second unit for communicating with a GSM or similar network. The access point is capable of issuing an identification code to be used by a terminal. In other words, the access point is involved in the exchange of information before actual access is granted, as in the other Prior Art documents mentioned above.

SUMMARY OF THE INVENTION

It is an object of the invention to provide a method and system for providing access to a first and a second network which requires less extensive modifications to the existing networks and network components. Therefore, a method of providing access to a first and a second network by using a terminal comprises, in accordance with the present invention, the steps of:
- the terminal requesting, via the first network, access to the first network while providing a first identification,
- the first network verifying the first identification and, if the verification is successful, issuing a second identification,
- the terminal requesting, via the first network, access to the second network while providing the second identification,
- an authentication server verifying the second identification and, if the verification is successful, issuing a third identification,
- the first network transmitting the third identification to the terminal, and
- the terminal using the third identification to obtain access to the second network.

By accessing only the first network until access to the second network has been granted, it is no longer necessary to grant partial and/or temporary access to the second network.

Such a method requires less extensive modifications because most terminals already include suitable software and/or hardware to be connected to a packet switched network, e.g. a network operating in accordance with the IP-protocol, and software and/or hardware to receive, transmit and process data and instructions received from the packet switched network, typically a web browser. Furthermore, most authentication servers, e.g. RADIUS servers for allowing access to a WLAN, already include suitable software and/or hardware to be connected to a packet switched network, e.g. a network operating in accordance with the Internet Protocol (IP) standard, and include software and/or hardware to receive, transmit and process data and instructions received from the packet switched network, e.g. a web-server application. Hence, only minor adaptations have to be made, for example to cause a web-browser application at the terminal to transmit a request and to cause a web-server application on the authentication server to generate and transmit an authentication code in response to this request.

The first identification preferably is a SIM card identification, thus utilizing the identification facilities which are present in GSM terminals and similar terminals. The second identification preferably is a network address, more preferably an IP (Internet Protocol) address. This allows a convenient identification using existing resources. The third identification preferably is a one-time password so as to attain a high level of security.

Various (types of) networks may be used. However, in a preferred embodiment the first network is a wireless network, preferably a packet switched wireless network such as a GPRS network or a GSM network, while the second network is a local area network (LAN), preferably a wireless local area network (WLAN).

The second identification may be stored in a memory which also stores user information associated with the second identification. If the second identification is a network address, then user (and/or terminal) information may be stored together with the network address in a suitable memory, for example in an IP session database. The user information may comprise subscription information.

The present invention is particularly advantageous when the first network and the second network have different operators, as the operator of the first network may determine to which second networks its customers may gain access.

The present invention also provides at least one computer program product for carrying out the method as defined above. A computer program product may comprise a set of computer executable instructions stored on a data carrier, such as a CD or a DVD. The set of computer executable instructions, which allow a programmable computer to carry out the method as defined above, may also be available for downloading from a remote server, for example via the Internet.

The present invention further provides an access control arrangement for providing access to a first network and a second network, and a network comprising such an access control arrangement. The present invention additionally provides a system comprising a first network and a second network, the first network being arranged for:
- upon receipt of a first access request and a first identification from a terminal, verifying the first identification and, if the verification is successful, issuing a second identification,
- upon receipt of a second access request and the second identification from the terminal, using an authentication server for verifying the second identification received from the terminal and, if the verification is successful, transmitting a third identification to the terminal.

These and other aspects of the invention will be apparent from and elucidated with reference to the embodiments described hereinafter. Specific embodiments of the invention are set forth in the dependent claims.

BRIEF DESCRIPTION OF THE DRAWINGS

Further details, aspects and embodiments of the invention will be described, by way of example only, with reference to the drawings.

DESCRIPTION OF PREFERRED EMBODIMENTS

In this document, the following abbreviations and/or terms are understood to have at least the following meaning. A wireless LAN or WLAN is a network in which a mobile user can connect to a local area network (LAN) through a wireless (radio) connection, for example a network complying with IEEE standard 802.11. A RADIUS client (which may, for instance, for example be an access server for a network, such as a dial-up server, or wireless access point) sends user credentials and connection parameter information in the form of a RADIUS message to a RADIUS server. The RADIUS protocol is defined in Internet Engineering Steering Group (IESG) Request for Comments (RFC) 2865. A RADIUS server authenticates and authorizes the RADIUS client request, and sends back a RADIUS message response. A RADIUS proxy is a computer that forwards RADIUS messages between RADIUS clients, RADIUS servers, and other RADIUS proxies.

SIM stands for Subscriber Identity Module. A SIM card is a type of smart card, which is inserted in a GSM telephone. The SIM card identifies the user's account to the network, handles authentication and provides data storage for basic user data and network information.

A Mobile Subscriber ISDN Number (MSISDN) is the number that callers dial to reach a mobile subscriber. The International Mobile Station Identity (IMSI) is a unique, non-dialable, number allocated to each mobile subscriber in the GSM system that identifies the subscriber and his or her subscription within the GSM network. The IMSI is typically stored in the SIM card.

A serving GPRS support node or SGSN is responsible for the delivery of data packets from and to the mobile stations within its service area. A gateway GPRS support node or GGSN acts as an interface between a backbone network and the SGSN. A GGSN converts the data packets coming from the SGSN into the appropriate packet data protocol for the backbone network and sends them out on the backbone network. In the other direction, incoming data packets from the backbone network are converted to packets suitable to be forwarded by the SGSN to mobile stations within the SGSN service area. The GGSN also performs authentication and charging functions. In general, there is a many-to-many relationship between the SGSNs and the GGSNs. That is, a GGSN may operate for one or more SGSNs and an SGSN may route its packets over one or more GGSNs to reach different backbone networks.

The Home Location Register or HLR includes the (central) database on a wireless network that stores relevant information about valid subscribers, such as the MSISDN (i.e. mobile phone number), IMSI, access privileges and/or the current location of a subscriber's mobile device. The HLR may for example be present on the GGSN.

Figure 1:
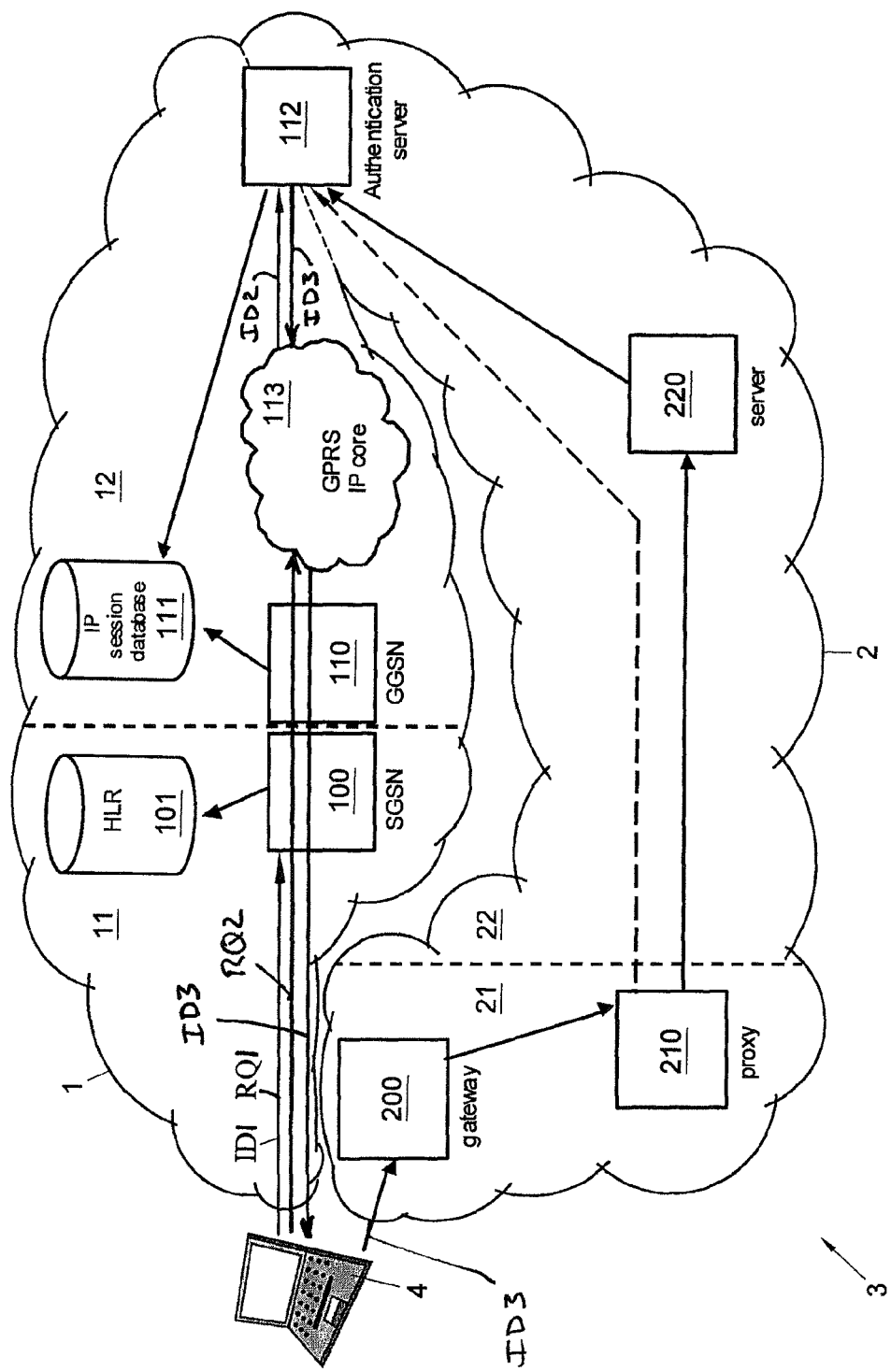
FIG. 1 schematically shows a block diagram of an exemplary embodiment of a telecommunications system according to the present invention.

Referring to FIG. 1, the merely exemplary communications system 3 shown in FIG. 1 includes a packet switched first network 1 and a second network 2. In the example of FIG. 1, the packet switched first network 1 is a telecommunications network, more in particular a packet switched mobile network, such as a GPRS (General Packet Radio Services) or UMTS (Universal Mobile Telecommunications System) network. However, the packet switched first network may be any suitable type of packet switched network. The packet switched first network may, for instance, be a network operated by the same operator as the second network, or be operated by a different operator.

The second network 2 may be any suitable type of network. For instance, the second network may, for instance, be a wireless network, such as a wireless local area network (WLAN) which can be accessed by a terminal via a wireless connection.

The system 3 shown in FIG. 1 further includes a terminal 4 and an access control. In this example, the access control includes a first access control arrangement which includes SGSN 100, GGSN 110, GPRS IP core 113 and authentication server 112, and a second access control arrangement which includes gateway 200, proxy 210, server 220 as well as authentication server 112.

Figure 2:
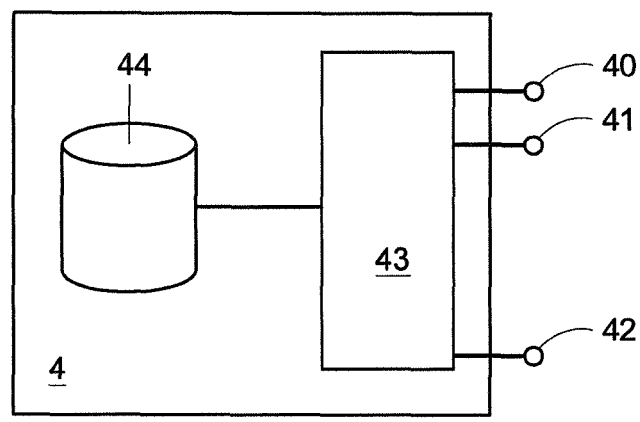
FIG. 2 schematically shows a block diagram of an exemplary embodiment of a terminal according to the present invention.

The terminal 4 may be implemented as shown in FIG. 2. The example shown in FIG. 2 includes a first terminal output 40 connectable to a packet switched network, e.g. the first network 1 shown in FIG. 1. The terminal 4 further has a terminal input 41 connectable to the packet switched network. The terminal 4 has a second terminal output 42 connectable to another network, e.g. the second network 2 in the example of FIG. 1. The terminal 4 further has a processing unit 43 connected to the terminal input 41, the terminal outputs 40,42. The terminal 4 further has a memory 44 connected to the processing unit 43.

The memory 44 may, for instance, be implemented as a SIM card reader in which a suitable SIM card is inserted. However, the memory 44 may be implemented in any suitable manner, and may for example include a non-volatile memory, such as a SIM card or other type of smart card. In the memory 44 an identification code for the first network 1 may be stored, e.g. the MSISDN, IMSI or other suitable type of code.

The processing unit 43 can retrieve, from the memory 44, the identification code and any other suitable type of information required to obtain access to the first network 1. The processing unit 43 is further provided with suitable hardware and/or software by means of which a connection can be established over a packet switched network. For example, the processing unit 43 may, for instance, include a suitable network connection module to connect to, e.g., an IP-network, and the processing unit 43 may, for instance, be able to run a web browser application which can transmit and receive data over the connection and process the data. E.g. the browser application may submit a request for a web page to a web server, receive the web page and process the web page such that it is outputted visually to the user of the terminal 4. The processing unit 43 can transmit the identification code for the first network via the first terminal output 40, and hence the first network 1, to an access control. Via the terminal input 41, the processing unit 43 can receive an assigned authentication code for the second network 2, e.g. in the example of FIG. 1 for the WLAN, from the access control. The received code may then be outputted at a user interface. Subsequently, a terminal authentication code can be inputted by a user at the terminal at a suitable input, to obtain access to the second network 4. The terminal authentication code may be transmitted by the processing unit 43 from the terminal 4 to the second network via the second terminal output 42. Alternatively, the processing unit 43 may be arranged to automatically forward the received code to the second network as the authentication code.

Figure 3:
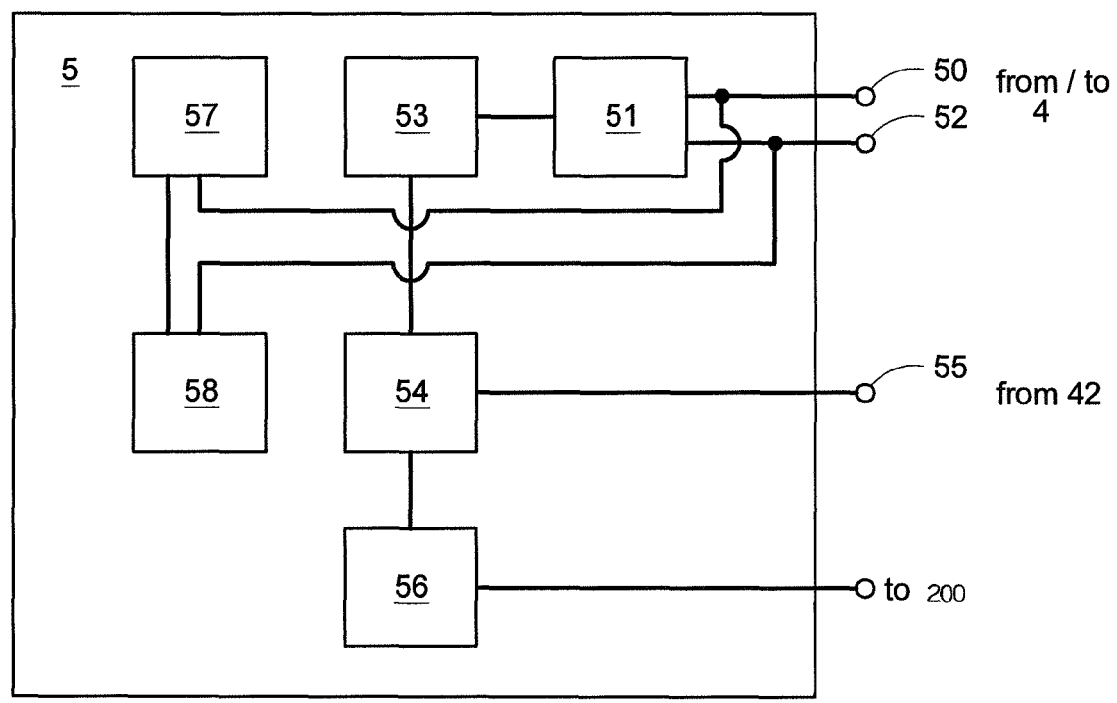
FIG. 3 schematically shows a block diagram of an exemplary embodiment of an access control arrangement according to the present invention.

FIG. 3 schematically shows an example of an access control arrangement 5. In FIG. 3 the access control arrangement 5 is shown as a single entity, however it should be noted, as e.g. shown in FIG. 1 that the access control arrangement 5 may include several separate entities, such as the SGSN 100, the GGSN 110 etc. connected to each other in a suitable manner.

In FIG. 3, the access control arrangement 5 includes a control input 50 for receiving a request for an authentication code via a packet switched first network. An authentication code generator 51 is connected to the control input 50. The authentication code generator 51 can generate, in response to the request, an assigned authentication code for the second network 2. The authentication code generator 51 is connected to a control output 52 connected to the first network. Via the control output 52, the authentication code can be transmitted, via the first network 1, to the terminal 4.

The access control arrangement 5 further includes an authentication controller 53 connected to the authentication code generator 51 and the second network 2. The authentication controller 53 can enable the assigned authentication code. That is, when the authentication code is enabled, access to the second network 2 will be allowed to the terminal 4 when an authentication code corresponding to the assigned authentication code is received by the second network 2. In this example, the authentication controller 53 is connected to an authentication code processor 54 and the authentication controller 53 transmits the generated or assigned authentication code to the authentication code processor 54.

The authentication controller system 5 further has an authentication controller input 55. The authentication controller input 55 is connected to the second network 2. At the authentication controller input 55 a terminal authentication code transmitted by the terminal 4 over the second network 2 can be received. The authentication code processor 54 is connected to the authentication controller input 55. The authentication code processor 54 can compare the received terminal authentication code with the assigned authentication code. The authentication code outputs the result of the comparison to a second access control 56, which is connected to the authentication code processor 53. The second access control 56 allows access to the second network 4 when the terminal authentication code corresponds to the assigned authentication code. It is noted that the term "corresponds" as used here does not necessarily imply complete identity of the authentication codes. A discrepancy between the authentication codes may be acceptable under certain circumstances. However, the authentication codes should preferably be sufficiently identical to exclude most or all fraudulent or malicious access attempts.

The access control arrangement 5 may further include a configuration which controls the access to the first network. In the example of FIG. 1, this is implemented by means of the SGNSN 100 and the GGSN 110 and separate from the entities which control the access to the second network, i.e. gateway 200, proxy 210, server 220 and authentication server 112. However, in FIG. 3 a block diagram is shown as a single entity to more clearly identify which units may be present in the system 3 to control access to the first network.

In FIG. 3, the access control arrangement 5 can receive the identification code from the terminal 4 via the control input 50. As shown in FIG. 3, an verification processor 57 is connected to the control input 50. The verification processor 57 can check the received identification code against a verification criterion. For example in FIG. 1, the SGSN 100 can retrieve from a memory 101, e.g. a HLR (Home Location Register), subscriber information and determine from the received identification code whether or not access to the first network 1 will be granted. An access control unit 58 is connected to the verification processor 57. The access control unit 58 allows access from the terminal 4 to the first network 1 when the identification code satisfies the verification criterion and terminates the access of the terminal 4 to the first network 1 when the identification code does not satisfy the verification criterion. The access control unit 58 is connected to control output 52 in order to transmit signals suitable to allow or terminate the access.

In the example of FIG. 1, a method according to the invention can be performed. Such a method includes providing access to the first network 1 and providing access to the second network 2 when access is provided to the first network 1. Providing access to the first network 1 may form a part of the method to provide access to the second network 2. However, it is also possible that the terminal has obtained access to the first network 1 a (long) period before access to the second network 2 is provided, for example before the terminal 4 is within reach of the second network 2. Access to the second network may therefore be allowed (well) in advance of the terminal actually obtaining access to the second network.

Access to the first network 1 may, for instance, be provided by transmitting, from the terminal 4, an identification code ID1 for access to the first network. The identification code ID1 may be accompanied by an access request RQ1, or be incorporated in the request RQ1.

The identification code ID1 is send to the first network where it is checked, e.g. at the SGSN 100 and the GGSN 110 in the example of FIG. 1, against a verification criterion. For instance, in the example of FIG. 1, the terminal 4 may transmit the MSISDN and/or IMSI and the SGSN 100 may, inter aha, compare the MSISDN and/or IMSI with information stored in the HLR 101. The SGSN 100 provides access in case the identification code is correct, e.g. the MSIDSN and/or IMSI belong to a subscriber of a network connected to the SGSN 100 and terminal is not listed in a database as stolen. (Of course, in case e.g. the terminal is listed as stolen or the identification code is not correct in another aspect, i.e. the identification code does not satisfy the verification criterion, the access of the terminal to the first network is terminated by the SGSN). After the SGSN 100 has allowed access, the GGSN may verify the identification code in order to allow access to the packet switched network which connects the authentication server to the GGSN. The GGSN may for example perform the accounting, authentication and administration (AAA) network security services required to provide access to a GPRS IP network. In the example of FIG. 1, for instance, the GPRS IP core network 113 connects the authentication server 112 to the terminal 4 via the SGSN 100 and the GGSN 110. It should be noted that a GSM/GPRS network is a combined speech and data communications network, in which the SGSN control the access to the entire network whereas the GGSN may be regarded as the control node for the access to the data communications network, e.g. the GPRS IP core 113 in FIG. 1.

Before, during or after obtaining access to the first network 1, a network address for the first network 1 may be assigned to the terminal 4 and the terminal 4 may be provided with data representing a network address of the authentication server in the first network 1. For instance in the example of FIG. 1, the GGSN and/or SGSN may assign an IP address via the Dynamic Host Configuration Protocol (DHCP) to the terminal 4 or any other type a network address suitable for the specific type of network.

After access is provided to the first network, a procedure to obtain access to the second network can be initiated. As mentioned, there may be a time interval between obtaining access to the second network and providing access to the first network. Also, multiple accesses to the second network may be requested, and granted, in advance.

Since the access to the first network 1 is verified and controlled, e.g. in the example of FIG. 1 by the SGNS 100 and the GGSN 110, the authentication server 112 does not have to verify the identification code and only requires information about the identity of the terminal 4 to assign an authentication code for the second network 2 to the terminal 4. Hence, only minor modifications are required to the authentication server to obtain this information, whereas no modifications are required to the first network 1, such as to the SGSN 100 and the GGSN 110. In the example of FIG. 1, the authentication server 112 is connected to a memory, in FIG. 1 the IP session database 111, in which the GGSN stores information about the identity of the terminal and/or the user of the terminal and the network address of the terminal, e.g. the IP address.

Access to the second network 2, e.g. in the example of FIG. 1 to the WLAN, may be provided by transmitting, from the terminal 4, an access request RQ2 for an authentication code to the authentication server 112 via the packet switched first network 1. In response to the request RQ2, the authentication server 112 can generate an assigned authentication code ID3 for the second network 2, e.g. in the example of FIG. 1 to the WLAN, and enable the assigned authentication code. That is, when the authentication code ID3 is enabled, access to the second network 2 will be allowed to the terminal 4 when an authentication code corresponding to the assigned authentication code ID3 is received by the second network 2, e.g. in the example of FIG. 1 by the WLAN. In the example of FIG. 1, for instance, the authentication server may determine, from the request RQ2, the source of the request, for example by determining the IP address from which the request RQ2 originates. The authentication server 112 may, for instance, retrieve from the IP session database 111 information ID2 about the identity of the user associated with the determined IP address, for example the MSISDN or IMSI associated with the determined IP address.

Based on the information ID2 about the identity of the user, or the IP address itself, the authentication server 112 can determine whether or not the terminal is allowed to obtain an authentication code for the second network 2. E.g. in case neither the MSISDN nor IMSI associated with the determined IP address is present in the IP session database 111, the authentication server 112 may determine that the request is fraudulent and may terminate the procedure. Also, in case the MSISDN or IMSI associated with the determined IP address reveals that the subscriber is not subscribed to services via the second network 2, the authentication server 4 may terminate the procedure.

In case the authentication server 112 continues the procedure, e.g. when the IP address corresponds to the MSISDN or the IMSI of a subscriber subscribed to services via the second network 2, the authentication server 112 transmits the authentication code ID3 to the terminal 4 via the packet switched first network 1, optionally in encrypted form. For instance, in the example of FIG. 1, the authentication server 112 may transmit the authentication code to the IP address of the request as a secure hypertext document in accordance with the hypertext over secure socket layer protocol (https). The terminal 4 may output the received authentication code ID3 at a user interface. A user may, after perceiving the received authentication code (for instance visually or as speech) subsequently input a terminal authentication code in an authorization application running on the terminal 4, for accessing the second network 2.

However, it is also possible that the terminal 4 automatically inputs the received authentication code in the authorization application as the terminal authorization code. For instance, on the terminal a web browser application may be running which initially requests a webpage from the authentication server and the authentication server may in response to this request transmit a webpage to the terminal which contains a login-script for the second network with the authentication code filled in. Upon receipt, the web browser application at the terminal executes the login script and transmits the pre-filled authentication code to the second network 2.

Such an automatic access to the second network 2 allows so called 'seamless roaming'. In 'seamless roaming', the terminal 4 is automatically switched between networks, e.g. to the most suitable network, without interference of the user of the terminal. To facilitate seamless roaming, for example, the terminal may further be provided with a detector which is able to automatically a presence of the second network. Thereafter, the access to the second network may be obtained automatically, and the second network be used instead of the first network to transmit and receive data from the terminal. Also, the network address assigned to said terminal for the first network may be the same as the network address assigned to said terminal for said second network. Furthermore, the terminal may be controlled such that when the terminal comes out of reach of the second network, the first network or another network is used instead of the second network to transmit or receive data.

In the second network, the terminal authentication code may then be compared with the assigned authentication code, and access to the second network from the terminal may be allowed when the terminal authentication code corresponds to the assigned authentication code. For instance in the example of FIG. 1, the terminal 4 transmits the terminal authentication code, optionally together with other data such as a user name, a terminal network address to a gateway 200 of the second network 2. The terminal 4 may for example transmit an access request containing the terminal authentication code, and optional other data.

The access request is received in the second network 2. For example, the access request may be received at a first node in the second network and a second node may be selected based on the received authentication code, after which the received authentication code is forwarded from the first node to the selected second node. For instance in the example of FIG. 1, in response to the access request, the gateway forwards the necessary data to the authentication server. For instance, the gateway may determine from the access request a suitable authentication server, e.g. in case the user name is of the type user@provider.com, the gateway 200 may forward the access request to the network of the provider. For instance in the example of FIG. 1, the gateway 200 may forward the request to a radius server 220 via a radius proxy 210. The radius proxy 210 may for example be operated by the same operator as the gateway 200 and include addresses and names of the radius server of providers which have an agreement with the gateway operator, as well as an identification for those providers, e.g. the string after the symbol '@' in the user name. The radius proxy 210 may for instance receive the access request from the gateway 200 and determine from the user name the associated radius server and transmit the access request for the second network 2 to this radius server. The radius server 220 receives the access requests and retrieves from the authentication server which authentication code has been assigned to the terminal, e.g. based on the IP address of the terminal or the identity of the user of the terminal. The radius server compares the assigned authentication code with the terminal authentication code and transmits to the gateway 200 either an 'access granted' message or an 'access denied' message. In response to the message, the gateway 200 either allows access or denies access. As indicated with the dashed arrow, it is also possible that the communication between the gateway 200 and the authentication server 112 is not routed via the server 220 (and/or via the proxy 210).

In case the first network has another operator than said second network, the second node, e.g. in this example the radius server 220, may include a memory in which information about the usage of the second network by the user of the terminal 4 is stored, in order to bill the user for the use of the second network. The billing for the second network may be combined with the billing for the first network. Thereby, the administrative load is reduced, since the user will not be billed by several entities.

The assigned authentication code may for example be a one-time password (OTP). Typically, WLANs are provided in public places, such as bars, restaurants, stations, airports etc. Hence, users of the WLAN will be connected to the WLAN for a, relatively, short period of time and a large number of different users will connect to the WLAN and a user will, e.g. when travelling, connect to different WLANs. The WLAN is typically operated by a different entity than the party, e.g.

mobile operator, to which a users is subscribed. Accordingly, in case a subscriber is provided with an authentication code which can be used more than once, either the same authentication code will be inputted in a large number of WLANs, and hence a large security risk or the user can only use a very limited number of WLANs. Accordingly, providing an OTP reduces the security risk and/or allows an increase of the number of WLANs that can be used.

The terminal 4 may be provided with a detection for the presence of the second network. For example, the terminal may include a transmitter/receiver suitable for the second network and the processing unit 43 in the example of FIG. 2 may be able to detect signals received from the second network and initiate communications with the second network, e.g. with the gateway 200. In case a presence of the second network is detected at the method, optionally some period of time after allowing access from the terminal to the first network, and optionally, after requesting at a user interface of the terminal a users permission to transmit the request, the terminal 4 may automatically transmit the access request to the gateway.

The invention may also be implemented in a computer program for running on a computer system, at least including code portions for performing steps of a method according to the invention when run on a programmable apparatus, such as a computer system or enabling a programmable apparatus to perform functions of a device or system according to the invention. Such a computer program may be provided on a data carrier, such as a CD-ROM or diskette, stored with data loadable in a memory of a computer system, the data representing the computer program. The data carrier may further be a data connection, such as a telephone cable or a wireless connection.

In the foregoing specification, the invention has been described with reference to specific examples of embodiments of the invention. It will, however, be evident that various modifications and changes may be made therein without departing from the broader spirit and scope of the invention as set forth in the appended claims. For example, in the embodiment shown in FIG. 1, instead of a GPRS network, the first network 1 may include a UMTS network or otherwise. Furthermore, the terminal may e.g. include a notebook computer, a personal digital assistant or other suitable apparatus.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. For example, the access control arrangement 5 shown in FIG. 3 may be implemented on separate nodes in the first network 1, e.g. as the SGSN 100, the GGSN 110 and the authentication server 112 shown in FIG. 1. Also, devices functionally forming separate devices may be integrated in a single physical device. For example, the radius server 220 and the authentication server 112 may be implemented as a single node in the second network.

Also, the first network may include any suitable type of mobile telecommunications network, and for example include a GPRS or UMTS network. Also, one or more of the first network and the second network may be an, at least partially, wireless data network, such as a wireless local area network. Furthermore, the first network may have another operator than (a part of) the second network. For instance in the example of FIG. 1, a first part 21 of the second network 2 including the gateway 200 and proxy 210 may be operated by a different entity than the first network 1 and a second part 22 of the second network 2 including the radius server 220, as indicated with the dashed line in FIG. 1. Similarly, the first network 1 may consist of a first part 11 and a second part 12 which may be operated by different entities.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

The invention claimed is:

1. A method of providing access to a first and a second network by using a terminal, the method comprising the steps of:
   requesting, by the terminal via the first network, access to the first network while providing a first identification,
   verifying, by the first network, the first identification and, if the verification is successful, issuing a second identification,
   requesting, by the terminal via the first network, from an authentication server accessible within the first network, access to the second network while providing the second identification,
   verifying, by the authentication server, the second identification and, if the verification is successful, issuing a third identification,
   transmitting, by the first network, the third identification to the terminal, and
   using, by the terminal, the third identification to obtain access to the second network.

2. The method according to claim 1, wherein the first identification is a SIM card identification.

3. The method according to claim 1, wherein the second identification is a network address.

4. The method according to claim 1, wherein the third identification is a one-time password.

5. The method according to claim 1, wherein the first network is wireless network and/or wherein the second network is a local area network.

6. The method according to claim 1, wherein the second identification is stored in a memory which also stores user information associated with the second identification.

7. The method according to claim 1, further comprising the step of supplying a network address of the authentication server to the terminal.

8. The method according to claim 1, further comprising the steps of:
   receiving, by the second network, the third identification at a first node, and
   forwarding, by the first node, the third identification to a selected second node of the second network, the second node being coupled to the first network.

9. The method according to claim 1, wherein the first network and the second network are operated by different operators.

10. The method according to claim 1, which is carried out automatically upon the terminal detecting a second network.

11. A non-transitory computer program product including computer-executable instructions for carrying out the method according to claim 1.

12. An access control arrangement, carried out by a computing system including one or more computing devices, for providing access to a first network and a second network, the access control arrangement comprising:
- a first verification processor unit for comparing a first received identification and a first assigned identification,
- a first access control unit connected to the first verification processor unit for providing access to the first network,
- a second verification processor unit, accessible by a terminal via the first network, for receiving, from the terminal, and verifying a second received identification by comparing the second received identification and a second assigned identification, and issuing a third identification, to the terminal, upon successfully verifying the second received identification, and
- a second access control unit for providing access, by the terminal, to the second network based on the third identification issued by the second verification processor unit to the terminal.

13. A communications network, comprising an access control arrangement according to claim 12.

14. A system comprising a first network and a second network, the first network being arranged for:
- verifying, upon receipt of a first access request and a first identification from a terminal via the first network, the first identification and, if the verification is successful, issuing a second identification, and
- upon receipt of a second access request and the second identification from the terminal, using an authentication server accessible within the first network for verifying the second identification received from the terminal and, if the verification is successful, transmitting a third identification to the terminal so as to allow access by the terminal to the second network.

15. The method of claim 3 wherein the network address is an Internet Protocol address.

16. The method of claim 5 wherein the local area network is a wireless network.

17. The method of claim 8 wherein the second node is selected using the received third identification.

* * * * *

UNITED STATES PATENT AND TRADEMARK OFFICE
CERTIFICATE OF CORRECTION

PATENT NO. : 8,533,798 B2  Page 1 of 1
APPLICATION NO. : 12/305568
DATED : September 10, 2013
INVENTOR(S) : Michael Robert Schenk It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1036 days.

Signed and Sealed this
Fifteenth Day of September, 2015

Michelle K. Lee
*Director of the United States Patent and Trademark Office*